US009572072B2

(12) United States Patent
Natarajan et al.

(10) Patent No.: US 9,572,072 B2
(45) Date of Patent: *Feb. 14, 2017

(54) METHOD AND APPARATUS FOR COMMUNICATING DELIVERY OF DATA PACKETS TO A USER EQUIPMENT IN A WIRELESS COMMUNICATION SYSTEM

(71) Applicant: Google Technology Holdings LLC, Mountain View, CA (US)

(72) Inventors: Balamurali N. Natarajan, Bangalore (IN); Naveen Arulselvan, Bangalore (IN); Manjari Chhawchharia, Bangalore (IN); Vihang G. Gangaram Kamble, Bangalore (IN); Suresh Kalyanasundaram, Bangalore (IN)

(73) Assignee: Google Technology Holding LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,615

(22) Filed: Sep. 23, 2014

(65) Prior Publication Data

US 2015/0009961 A1 Jan. 8, 2015

Related U.S. Application Data

(63) Continuation of application No. 13/497,300, filed as application No. PCT/US2010/053289 on Oct. 20, 2010, now Pat. No. 8,897,223.

(30) Foreign Application Priority Data

Oct. 30, 2009 (IN) .......................... 2250/DEL/2009

(51) Int. Cl.
*H04W 36/00* (2009.01)
*H04B 7/155* (2006.01)
(Continued)

(52) U.S. Cl.
CPC ..... *H04W 36/0016* (2013.01); *H04B 7/15521* (2013.01); *H04L 1/1809* (2013.01);
(Continued)

(58) Field of Classification Search
None
See application file for complete search history.

(56) References Cited

U.S. PATENT DOCUMENTS 7,525,908 B2 * 4/2009 Olsson et al. ................ 370/229
2004/0090936 A1 * 5/2004 Cuny et al. ................... 370/331
(Continued)

FOREIGN PATENT DOCUMENTS

EP 2051454 A1 4/2009

OTHER PUBLICATIONS

Wiemann H. et al., "A Novel multi-hop ARQ concept", 2005 IEEE 61st Vehicular Technology Conference, VTC2005—Spring—May 30-Jun. 1, 2005—Stockholm, Sweden, IEEE, Piscataway, NJ, USA, vol. 5, May 30, 2005, pp. 3097-3101, XP010856020.
(Continued)

Primary Examiner — Hong Cho
(74) Attorney, Agent, or Firm — Lerner, David, Littenberg, Krumholz & Mentlik, LLP (57) ABSTRACT

In a communication system (100) where a wireless relay node (RN) (114) relays data packets between a Node B (112) and a user equipment (UE) (102), the RN receives (608) a data packet from the Node B via a first wireless link (115), conveys (614) the received data packet to the UE via a second wireless link (120), determines (616) whether the UE is likely to handoff, and in response to determining that the UE is likely to handoff, delays conveying (620, 622) an acknowledgment of the data packet to the Node B until an acknowledgment has been received from the UE. In another embodiment, the RN may use a status report (720) to inform
(Continued)

the Node B of data packets that have not been transmitted to the UE or that have been transmitted to the UE but for which an acknowledgement has not been received from the UE.

6 Claims, 5 Drawing Sheets

(51) Int. Cl.
*H04L 1/18* (2006.01)
*H04W 36/02* (2009.01)
*H04W 84/04* (2009.01)
*H04L 1/00* (2006.01)

(52) U.S. Cl.
CPC .... *H04L 1/1854* (2013.01); *H04L 2001/0097* (2013.01); *H04W 36/023* (2013.01); *H04W 84/047* (2013.01)

(56) References Cited

U.S. PATENT DOCUMENTS

2007/0091810 A1* 4/2007 Kim et al. .................... 370/236
2008/0062911 A1* 3/2008 Choi et al. .................... 370/315
2008/0117877 A1 5/2008 Min et al.
2008/0317017 A1 12/2008 Wiemann et al.

OTHER PUBLICATIONS

Extended European Search Report for Application No. 14162232.4 dated May 9, 2014.

\* cited by examiner

METHOD AND APPARATUS FOR COMMUNICATING DELIVERY OF DATA PACKETS TO A USER EQUIPMENT IN A WIRELESS COMMUNICATION SYSTEM

CROSS-REFERENCE

The present application is a continuation of U.S. patent application Ser. No. 13/497,300, filed on Mar. 21, 2012, which is a national phase entry under 35 U.S.C. §371 of International Application No. PCT/US2010/053289, filed Oct. 20, 2010, published in English, which claims priority from India Application No. IN 2250/DEL/2009, filed Oct. 30, 2009, all of which are incorporated herein by reference.

FIELD OF THE INVENTION

The present invention relates generally to wireless communication systems, and more specifically to communicating delivery of data packets to a user equipment in a communication session involving a wireless relay node.

BACKGROUND OF THE INVENTION

In Fourth Generation (4G) cellular communication systems, such as 3GPP LTE-Advanced and IEEE (Institute of Electrical and Electronics Engineers) 802.16j communication systems, it has been proposed to use Relay Nodes (RNs) to improve user throughput at a cell edge and to enhance overall system coverage. A Relay Node (RN) would have a wireless backhaul connection to an eNodeB (evolved Node B) serving the RN and operate at a lower transmission power level, and provide service to a smaller coverage area, than the eNodeB. The RN would exchange data with a user equipment (UE) served by the RN and would, in turn, transfer data to, and receive data intended for the UE from, the serving eNodeB. The eNodeB also would provide wireless service to users equipment (UEs) in the coverage area of the eNodeB not under the coverage of RNs associated with, that is, served by, the eNodeB.

The current proposals provide that when an eNodeB receives a data packet intended for a UE that is served by an associated RN, the eNodeB stores the data packet in a buffer and transmits the data packet to the RN. In response to receiving the data packet, the RN conveys an acknowledgement of the data packet to the eNodeB. In response to receiving the acknowledgement, the eNodeB deletes the data packet from the eNodeB's buffer. The RN also stores the data packet in a buffer and transmits the data packet to the UE. In response to receiving an acknowledgement of the data packet from the UE, the RN deletes the data packet from the RN's buffer.

When the UE is being handed off from a serving, or source RN, to a target RN or to a new, target eNodeB, an issue arises as to how to determine, by the target RN or target or source eNodeBs, data packets that have been correctly received by the source RN but have not been correctly received by the UE, for example, data packets that have not been transmitted by the RN to the UE or data packets that have been transmitted to, but not correctly received by, the UE. Therefore, a need exists for a method and apparatus for communicating which data packets have been delivered to a UE prior to being handed-off by a serving, or source, RN.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need that exists for a method and apparatus for determining which data packets have been successfully delivered to a user equipment (UE) prior to being handed-off by a serving, or source RN, a communication system is provided where a wireless relay node serves to relay data packets from a Node B to a UE and from the UE to the Node B. The wireless relay node receives a data packet from the Node B via a first wireless link, stores the received data packet, conveys the received data packet to the UE via a second wireless link, determines whether the UE is likely to handoff, and in response to determining that the UE is likely to handoff, delays conveying an acknowledgment of the data packet to the Node B until an acknowledgment has been received from the UE. In another embodiment, the wireless relay node may use a status report to inform the Node B of one or more data packets that have not been transmitted to the UE or that have been transmitted to the UE but for which an acknowledgement has not been received from the UE.

Generally, an embodiment of the present invention encompasses a method for communicating delivery of data packets to a user equipment (UE). The method includes receiving a data packet from a Node B via a first wireless link, conveying the received data packet to a user equipment via a second wireless link, determining whether the UE is likely to handoff, and in response to determining that the UE is likely to handoff, delaying conveying an acknowledgment of the data packet to the Node B until an acknowledgment has been received from the UE.

Another embodiment of the present invention encompasses a method for communicating delivery of data packets to a UE. The method includes receiving multiple data packets from a Node B via a first wireless link, conveying one or more data packets of the multiple data packets to a UE via a second wireless link, maintaining a status of data packets received from the Node B but not yet acknowledged to the Node B, assembling a status report indicating which data packets of the multiple data packets have one or more of not been transmitted to the UE and transmitted to the UE but for which an acknowledgement has not been received from the UE, and conveying the status report to the Node B via a wireless backhaul link.

Yet another embodiment of the present invention encompasses wireless relay node that includes a radio frequency (RF) receiver, an RF transmitter, an at least one memory device, and a processor. The processor is configured to receive a data packet from a Node B via the RF receiver and a first wireless link, store the received data packet in the at least one memory device, convey the received data packet to a UE via the RF transmitter and a second wireless link, determine whether the UE is likely to handoff, and in response to determining that the UE is likely to handoff, delay conveying an acknowledgment of the data packet to the Node B until an acknowledgment has been received from the UE.

Still another embodiment of the present invention encompasses wireless relay node that includes a radio frequency (RF) receiver, an RF transmitter, an at least one memory device, and a processor. The processor is configured to receive multiple data packets from a Node B via the RF receiver and a first wireless link, convey one or more data packets of the multiple data packets to a UE via the RF transmitter and a second wireless link, maintain, in the at least one memory device, a status of data packets received from the Node B but not yet acknowledged to the Node B, assemble a status report indicating which data packets of the multiple data packets have one or more of not been transmitted to the UE and transmitted to the UE but for which an acknowledgement has not been received from the UE, and convey the status report to the Node B via the RF transmitter and a wireless backhaul link.

Figure 1:
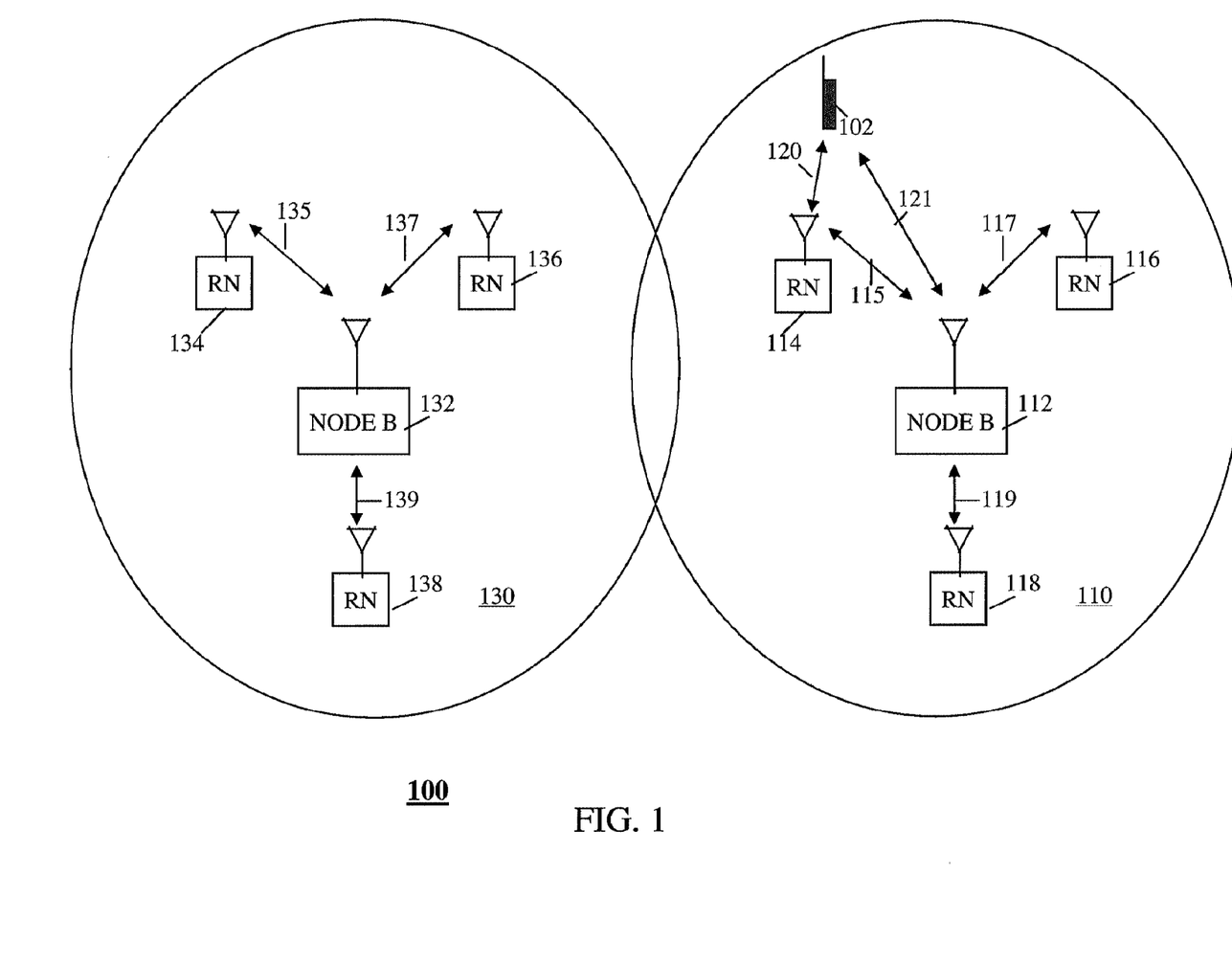
FIG. 1 is a block diagram of a wireless communication system in accordance with various embodiments of the present invention.

Turning now to the drawings, the present invention may be more fully described with reference to FIGS. 1-7. FIG. 1 is a block diagram of a wireless communication system 100 in accordance with various embodiments of the present invention. Preferably, communication system 100 is a 3GPP (Third Generation Partnership Project) Long Term Evolution (LTE) communication system hat provides packet data communication services to subscribers serviced by the system. To ensure compatibility, radio system parameters and call processing procedures are specified by the standards, including call processing steps that are executed by an UE and an access network serving the UE and between the access network and associated infrastructure. However, those of ordinary skill in the art realize that communication system 100 may operate in accordance with any one of a variety of wireless packet data communication systems that supports multimedia packet data-based communication sessions, such as but not limited to 3GPP2 UMB (Ultra Mobile Broadband) communication systems, various IEEE (Institute of Electrical and Electronics Engineers) 802.xx communication systems such as WiMAX communication systems, or future generation 3GPP LTE-Advanced or IEEE (Institute of Electrical and Electronics Engineers) 802.xx, such as 802.16j, communication systems.

Communication system 100 includes a wireless user equipment (UE) 102, for example but not limited to a cellular telephone, a radiotelephone, a smartphone, or a Personal Digital Assistant (PDA), personal computer (PC), or laptop computer that supports wireless communications. Communication system 100 further comprises multiple wireless access points 112, 132 (two shown), such as base stations, access points (APs), or Node Bs, and preferably evolved Node Bs (eNodeBs) (collectively referred to herein, for ease of reference, as Node Bs), that each provides wireless communications services to users' equipment (UEs) located in a corresponding coverage area 110, 130 of the Node B either directly or via one or more Relay Nodes serviced by the Node B.

For example, Node B 112 provides wireless communications services to coverage area 110 both directly and via multiple RNs 114, 116, 118 (three shown). Node B 112 communicates with the multiple RNs 114, 116, 118 via corresponding Node B-RN wireless links 115, 117, 119. In turn, each RN of the multiple RNs 114, 116, 118 provides wireless communications services to UEs located in a coverage area of the RN, and correspondingly of Node B 112, via a corresponding RN-UE wireless link. For example, as depicted in FIG. 1, RN 114 provides wireless communications services to UE 102 via RN-UE wireless link 120. Node B 112 also may communicate directly with UEs residing in a coverage area of the Node B via Node B-UE wireless links, such as Node B-UE wireless link 121 between Node B 112 and UE 102. Similarly, Node B 132 provides wireless communications services to coverage area 130 both directly and via multiple RNs 134, 136, 138 (three shown). Node B communicates with the multiple RNs 134, 136, 138 via corresponding Node B-RN wireless links 135, 137, 139. In turn, each RN of the multiple RNs 134, 136, 138 provides wireless communications services to UEs located in a coverage area of the RN via a corresponding RN-UE wireless link (not shown). Similar to Node B 112, Node B 132 also may communicate directly with UEs residing in a coverage area of the Node B via Node B-UE wireless links (not shown). Each wireless link 115, 117, 119, 120, 135, 137, 139 includes a forward link having traffic and control channels and a reverse link having traffic and control channels. The reverse links of the Node B-RN wireless links 115, 117, 119, 135, 137, and 139 also are referred to herein as wireless backhaul links.

Figures 2, 3, 4:
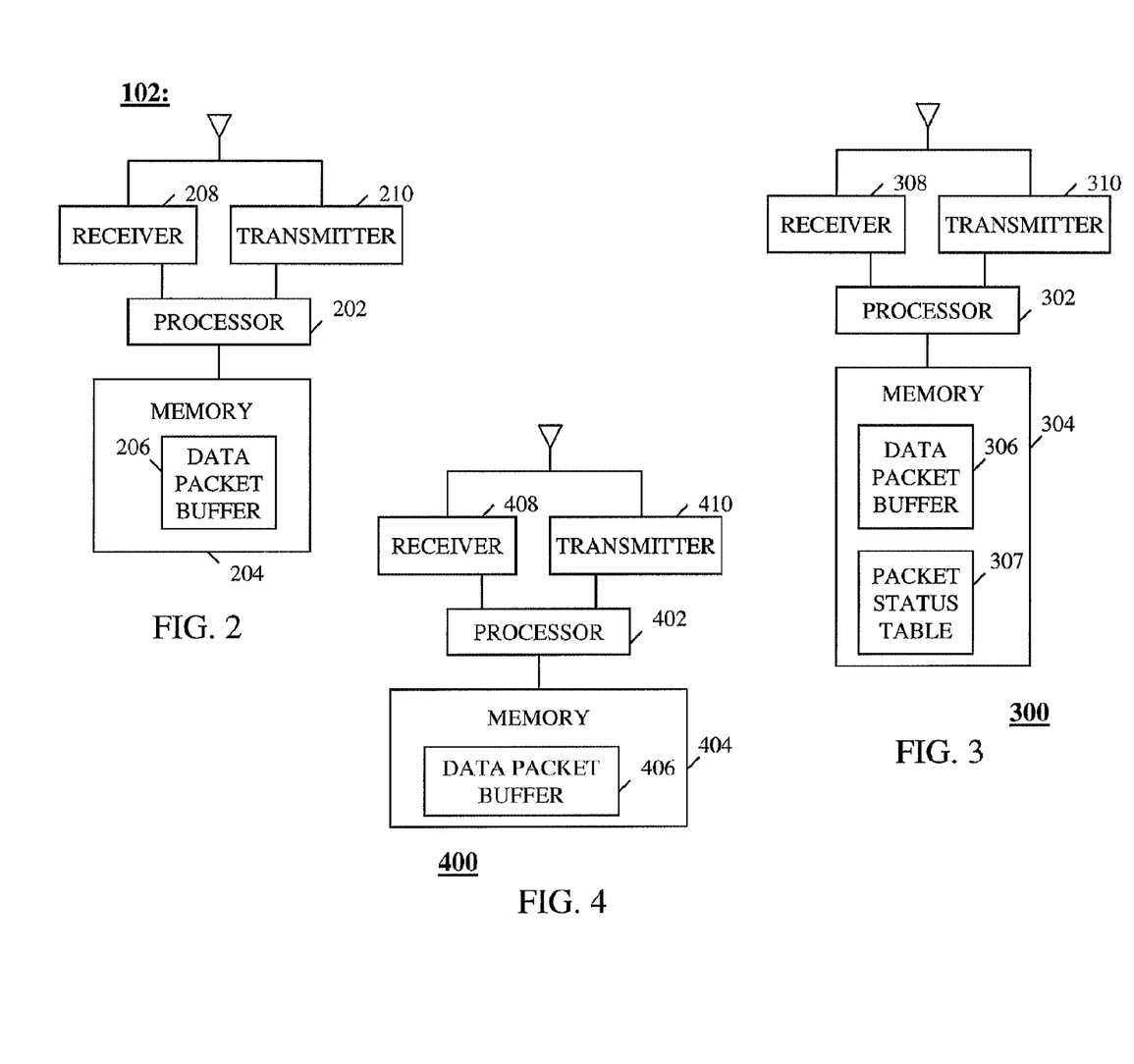
FIG. 2 is a block diagram of a user equipment (UE) of FIG. 1 in accordance with an embodiment of the present invention.
FIG. 3 is a block diagram of a Relay Node (RN) of FIG. 1 in accordance with an embodiment of the present invention.
FIG. 4 is a block diagram of a Node B of FIG. 1 In accordance with an embodiment of the present invention.

Referring now to FIG. 2, a block diagram of UE 102 is provided in accordance with an embodiment of the present invention. UE 102 includes a processor 202, such as one or more microprocessors, microcontrollers, digital signal processors (DSPs), combinations thereof or such other devices known to those having ordinary skill in the art, which processor is configured to execute the functions described herein as being executed by UE 102. UE 102 further includes an at least one memory device 204, such as random access memory (RAM), dynamic random access memory (DRAM), and/or read only memory (ROM) or equivalents thereof, that is coupled to the processor and that maintains data and programs that may be executed by the associated processor and that allows the UE to perform all functions necessary to operate in communication system 100. At least one memory device 204 further includes a data packet buffer 206, preferably a Radio Link Control (RLC) buffer, that stores data packets received over a wireless link. UE 102 further includes a radio frequency (RF) receiver 208 and an RF transmitter 210 for exchanging wireless communications with RNs, such as RNs 114, 116, 118, 134, 136, and 138, and Node Bs, such as Node Bs 112 and 132.

Referring now to FIG. 3, a block diagram of an RN 300, such as RNs 114, 116, 118, 134, 136, and 138, is provided in accordance with an embodiment of the present invention. RN 300 includes a processor 302, such as one or more microprocessors, microcontrollers, digital signal processors (DSPs), combinations thereof or such other devices known to those having ordinary skill in the art, which processor is configured to execute the functions described herein as being executed by the RN. RN 300 further includes an at least one memory device 304 that may comprise random access memory (RAM), dynamic random access memory (DRAM), and/or read only memory (ROM) or equivalents thereof, that maintain data and programs that may be executed by the associated processor and that allow the RN to perform all functions necessary to operate in communication system 100. At least one memory device 304 further includes a data packet buffer 306, preferably a Radio Link Control (RLC) buffer, that stores data packets received over and/or for transmission over a wireless link. In various embodiments of the present invention, RN 300 may include a single data packet buffer or may include separate data packet buffers in association with each UE serviced by the RN. RN 300 further includes an RF receiver 308 and an RF transmitter 310 for exchanging wireless communications with UEs, such as UE 102, and Node Bs, such as Node Bs 112 and 132.

Referring now to FIG. 4, a block diagram of Node B 400, such as Node Bs 112 and 132, is provided in accordance with an embodiment of the present invention. Node B 400 includes a processor 402, such as one or more microprocessors, microcontrollers, digital signal processors (DSPs), combinations thereof or such other devices known to those having ordinary skill in the art, which processor is configured to execute the functions described herein as being executed by the Node B. Node B 400 further includes an at least one memory device 404 that may comprise random access memory (RAM), dynamic random access memory (DRAM), and/or read only memory (ROM) or equivalents thereof, that maintain data and programs that may be executed by the associated processor and that allow the Node B to perform all functions necessary to operate in communication system 100. At least one memory device 404 further includes one or more data packet buffers 406 (one shown), preferably Radio Link Control (RLC) buffers, that store data packets that are to be transmitted over a wireless link. In various embodiments of the present invention, Node B 400 may include a single data packet buffer or may include separate data packet buffers in association with each UE and/or RN serviced by the Node B. Node B 400 further includes an RF receiver 408 and an RF transmitter 410 for exchanging wireless communications with RNs, such as RNs 114, 116, 118, 134, 136, and 138, and UEs, such as UE 102. As referred to herein, RNs 114, 116, 118, 134, 136, and 138 and Node Bs 112 and 132 are part of an infrastructure, or network, of communication system 100 and may each be referred to herein as a network element of communication system 100.

The functionality described herein as being performed by UE 102, RNs 114, 116, 118, 134, 136, and 138, and Node Bs 112 and 132, is implemented with or in software programs and instructions stored in the respective at least one memory device 204, 304, 404 associated with the UE, RN, and Node B and executed by the respective processor 202, 302, 402, associated with the UE, RN, and Node B. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the UE, RN, and Node B. Based on the present disclosure, one skilled in the art will be readily capable of producing and implementing such software and/or hardware without undo experimentation.

Figure 5:
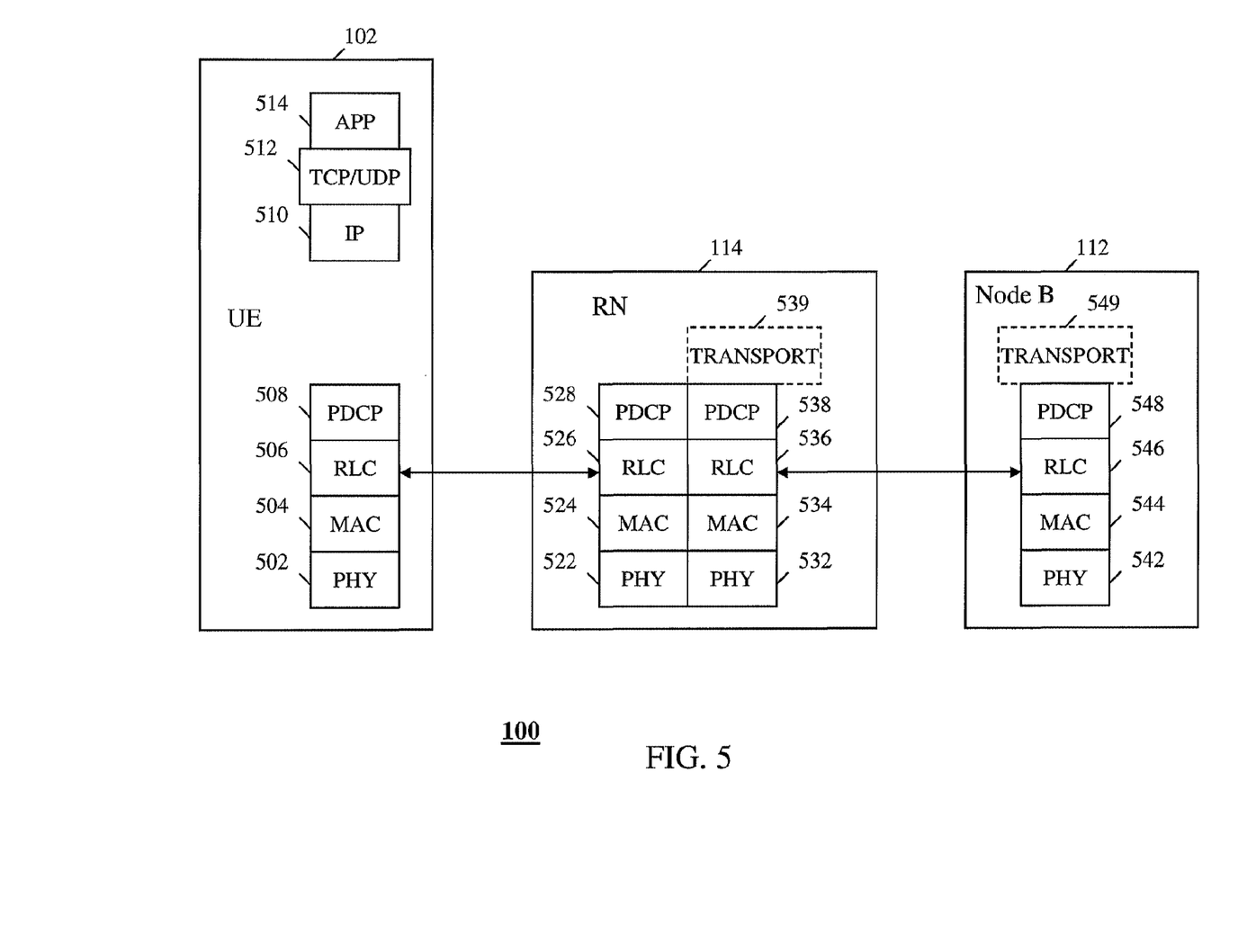
FIG. 5 is a block diagram of protocol stacks implemented by the wireless communication system of FIG. 1 in accordance with an embodiment of the present invention.

Referring now to FIG. 5, a block diagram of a protocol stack implemented by communication system 100, for example, by UE 102, RN 114, and Node B 112, is provided in accordance with an embodiment of the invention. A layered representation of protocols is commonly known as a protocol stack. A protocol stack, such as the TCP/IP protocol stack, typically includes at least five layers, which layers are, from highest to lowest, an Application Layer, a Transport Layer, a Network Layer, a Link Layer, and a Physical Layer. The bottom layer, that is, the Physical Layer, includes the network hardware and a physical medium for the transportation of data. The next layer up from the Physical Layer is the Link Layer, or Layer 2, which implements protocols that assure a reliable transmission of data in a communication system that guarantees delivery of data. Layer 2 functionality of an LTE protocol stack includes a Medium Access Control (MAC) Layer sub-layer, a Radio Link Control (RLC) sub-layer, and a Packet Data Compression Protocol (PDCP) sub-layer.

Layer 3, or the Network Layer, is responsible for delivering data across a series of different physical networks that interconnect a source of the data and a destination for the data. Routing protocols, for example, an IP (Internet Protocol) protocol such as IPv4 or IPv6, are included in the network layer. An IP data packet exchanged between peer network layers includes an IP header containing information for the IP protocol and data for the higher level protocols. The IP header includes a Protocol Identification field and further includes transport addresses, typically IP addresses, corresponding to each of a transport layer sourcing the data packet and a transport layer destination of the data packet. A transport address uniquely identifies an interface that is capable of sending and receiving data packets to transport layers via the network layer.

The next layer up from the Network Layer is the Transport Layer. As is known in the art, the Transport Layer is responsible for delivering data to an appropriate application process. This involves forming data packets and adding source and destination identifiers, such as port numbers, in the header of each transport layer data packet. As depicted in FIG. 5, the Transport Layer of an LTE protocol stack includes a first encapsulation module that may utilize any of several Transport Layer protocols, such as the User Datagram Protocol (UDP) or Transmission Control Protocol (TCP), to encapsulate data received from the application layer or to remove headers of packets received from the Network Layer. The next layer up from the Transport Layer is the Application Layer.

A reliable Transport Layer protocol, such as TCP, may use RLC to guarantee that messages reach their destination complete and uncorrupted and in the order they were sent. In order to assure a reliable transmission, RLC implements an acknowledgement scheme that employs a retransmission of frames of data that were lost over the radio interface. That is, when an RLC sub-layer of a transmitting wireless communication device, such as any of UE 102, RNs 114, 116, 118, 134, 136, and 138, and Node Bs 112 and 132, receives an upper layer data packet (from the PDCP sub-layer), in particular an SDU (Service Data Unit), for transmission over a wireless link, the RLC sub-layer stores the data packet in the communication device's RLC buffer. The RLC sub-layer adds an RLC header to the SDU to produce a PDU (Protocol Data Unit) and conveys the PDU, via the lower layers, to a receiving device. When the sending and receiving wireless communication devices are operating in an RLC-Acknowledged mode (RLC-AM), the sending device, and in particular the RLC sub-layer of the sending device, does not delete the data packet from the sending device's RLC buffer until the sending device's RLC sub-layer receives an RLC acknowledgment (ACK) of the data packet from the RLC sublayer of the receiving device. When the sending and receiving wireless communication devices are operating in an RLC-Unacknowledged mode (RLC-UM), the sending device's RLC sub-layer deletes the data packet from the sending device's RLC buffer upon transmission of the data packet.

As depicted in FIG. 5, a protocol stack of UE 102 includes a Physical Layer 502, a Link Layer comprising a MAC layer 504, an RLC layer 506, and a PDCP layer 508, a Network Layer comprising an IP layer 510, a Transport Layer comprising a TCP/UDP layer 512, and an Application Layer 514. A protocol stack of a UE side of RN 114, that is, a protocol stack employed by the RN for interfacing with a UE such as UE 102, includes a Physical Layer 522 and a Link Layer comprising a MAC sub-layer 524, an RLC sub-layer 526, and a PDCP sub-layer 528. A protocol stack of a Node B side of RN 114, that is, a protocol stack employed by the RN for interfacing with a Node B such as Node B 112, includes a Physical Layer 532, a Link Layer comprising a MAC sub-layer 534, an RLC sub-layer 536, and a PDCP sub-layer 538, and a Transport Layer 539 comprising, for example, a TCP/UDP module. A protocol stack of Node B 112 employed for interfacing with an RN, such as RN 112, includes a Physical Layer 542, a Link Layer comprising a MAC sub-layer 544, an RLC sub-layer 546, and a PDCP sub-layer 548, and a Transport Layer 549 comprising, for example, a TCP/UDP layer.

While UE 102, RN 114, and Node B 112 are referenced in FIG. 5, these elements of communication system 100 are depicted merely to exemplify the protocol layering employed by communication system 100 and one of ordinary skill in the art realizes that the protocol layering depicted in FIG. 5 may be applicable to any UE, RN, or Node B in the communication system. Preferably, the protocol stacks employed by each such network element is implemented by the processor of the element based on programs maintained by the at least one memory device of the element.

In communication system 100, when UE 102 is engaged in a communication session with a first RN, such as RN 114, the UE may roam through the system. As a result of the roaming, situations may arise where it is desirable to hand off UE 102 from the currently serving, source RN and Node B to another, target RN and/or Node B. For example, while roaming in communication system 100 and being serviced by RN 114, which is in turn serviced by Node B 112, UE 102 may receive a stronger signal or a higher quality signal directly from a Node B, such as Node Bs 112 or 132, or from another RN, such as RN 136, that mayor may not be serviced by a different Node B, such as Node B 138 in the case of RN 136.

In order to facilitate a handoff of a UE, such as UE 102, communication system 100 provides a method and apparatus for acknowledging data packets when the UE is actively engaged in a communication session, such as a voice call and/or a non-voice call, such as video, that involves an RN. In one embodiment of the invention, when a serving Node B is exchanging data packets with a UE via a serving RN, and the serving Node B, serving RN, and UE are operating in an acknowledgment mode, the serving Node B will delete a data packet in the Node B's data packet buffer when an acknowledgment is received for the data packet. In order to conserve wireless link resources, the serving RN will determine whether the UE is likely to handover. If the UE is likely to handover, the serving RN will delay conveying an acknowledgment to the serving Node B for data packets correctly received by the serving RN until an acknowledgment is received from the UE. Meanwhile, the serving RN may promptly convey to the Node B a negative acknowledgment (NACK) for data packets incorrectly received from the Node B. In another embodiment of the present invention, a serving RN sends, to a serving Node B, a status report that is UE-specific and that indicates one or more of (1) which data packets have not yet been transmitted by the RN to the UE, and (2) which data packets have been transmitted to, but not yet acknowledged by, the UE.

Figure 6:
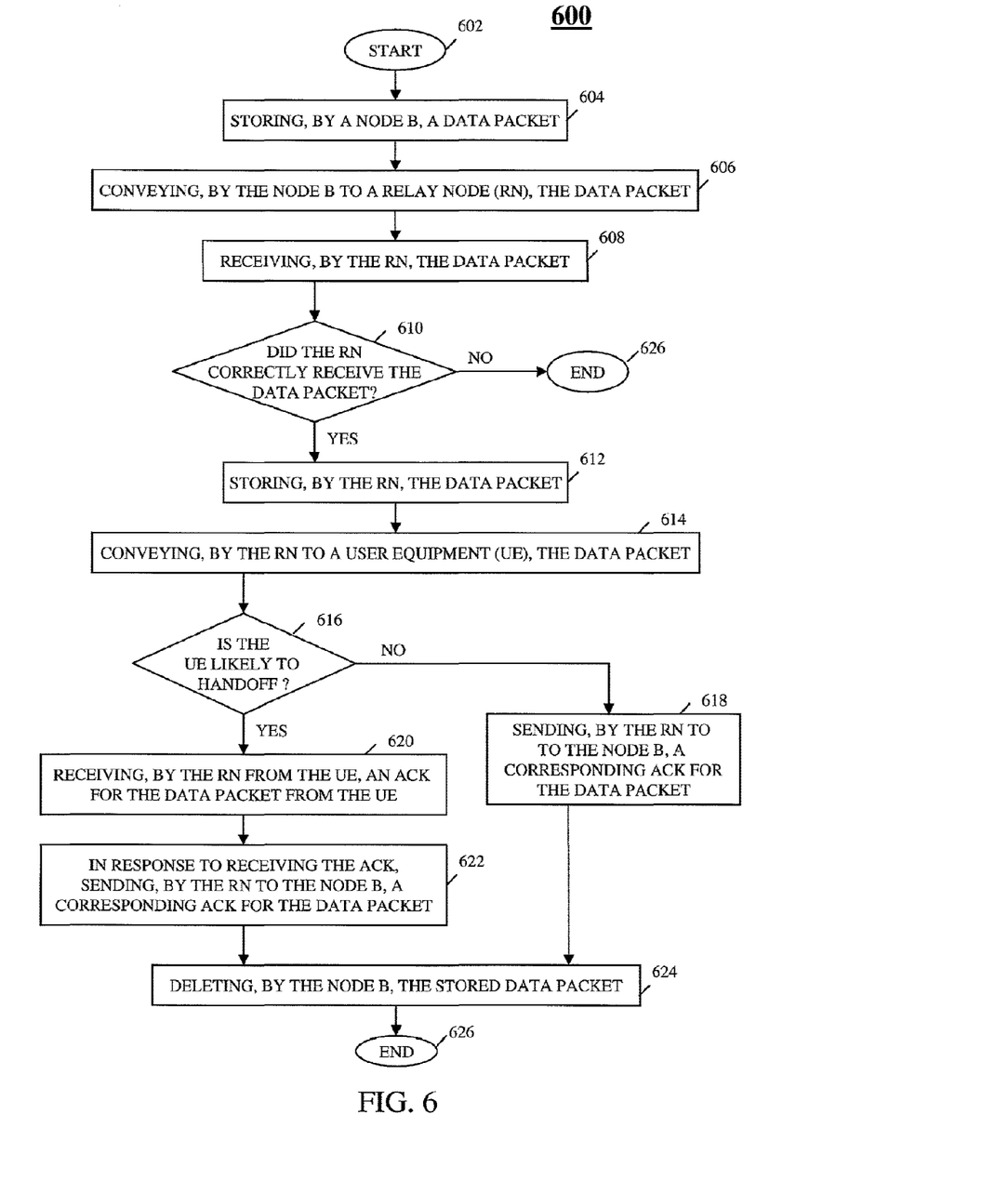
FIG. 6 is a logic flow diagram of a method executed by the communication system of FIG. 1 in acknowledging data packets in accordance with an embodiment of the present invention.

Referring now to FIG. 6, a logic flow diagram 600 is provided that illustrates a method executed by communication system 100 in communicating delivery of data packets to a UE in accordance with an embodiment of the present invention. Logic flow diagram 600 begins (602) when a serving Node B, such as Node B 112, conveys (606) to a served RN, such as RN 114, and the RN receives (608) from the Node B, via a first wireless link, that is Node B-RN wireless link 115, a data packet intended for a UE, such as UE 102, serviced by the RN. Serving Node B 112 further stores (604) the conveyed data packet in a data packet buffer 406 of the Node B. If RN 114 incorrectly receives (610) the data packet, then the RN conveys a negative acknowledgment (NACK), or may not convey any acknowledgement, of the data packet to Node B 112 and logic flow 600 ends (626). If RN 114 correctly receives (610) the data packet, then the RN stores (612) the data packet in a data packet buffer 306 of the RN and conveys (614) the packet to UE 102 Via a second wireless link, that is, RN-UE wireless link 120. Preferably, the acknowledgment scheme described in logic flow diagram 600 is implemented at the link layer, and in particular at the RLC sub-layer of the link layer, at each of UE 102, RN 114, and Node B 112, such that the buffer is an RLC buffer, the exchanged data packets are RLC protocol data units (PDUs), and the acknowledgements are RLC ACKs/NACKS. However, in other embodiments of the present invention the acknowledgment scheme may be implemented in other protocol layers, such as at the Transport Layer utilizing TCP acknowledgments.

In addition to conveying the packet to UE 102, RN 114 determines (616) whether UE 102 is 'likely to handoff.' For example, UE 102 may report monitored pilot(s) back to serving RN 114 in accordance with known reporting procedures. For example, UE 102 may regularly report back signal qualities for all monitored pilots, or the UE may report a monitored pilot(s) back to RN 114 when a quality of a monitored pilot of a nonserving network element exceeds a first reporting threshold or a quality of a monitored pilot of a currently serving network element falls below a second reporting threshold. Based on the reported pilot qualities, RN 114 then may determine whether UE 102 is likely to handoff. For example, when a measured quality of the pilot of serving RN 114 is less than a measured quality of a pilot of another network element, such as any of RN 116, 118, 134, 136, 138 or Node B 112 and 132 by greater than a handover threshold, which threshold may be the same as, or may be less than, a difference threshold that would trigger a handoff, then RN 114 may determine that UE 102 is 'likely to handover.' By way of another example, when a measured quality of the pilot of serving RN 114 falls to within a measured quality of a pilot of another network element, such as any of RN 116, 118, 134, 136, 138 or Node B 112 and 132 by less than another handover threshold, which threshold may be the same as, or may be greater than, a difference threshold that would trigger a handoff, then RN 114 may determine that UE 102 is 'likely to handover.' In other embodiments, any other indication that a UE may be trending toward a handoff may be applied here, such as a measured signal quality of a pilot of a currently serving network element, that is, RN 114, trending downward over time and further falling to within a predetermined margin of a first handoff threshold and/or a measured signal quality of a pilot of a non-serving network element trending upward over time and further rising to within a predetermined margin of a second handoff threshold.

If RN 114 determines that UE 102 is not likely to handoff, then in response to correctly receiving the data packet from serving Node B 112, RN 114 conveys (618) an acknowledgment (ACK) of the data packet to serving Node B 112 via the reverse link, or wireless backhaul link, of Node B-RN wireless link 115 without first waiting to receive to receive an acknowledgment of the data packet from UE 102. If RN 114 determines that UE 102 is likely to handoff, then, in response to correctly receiving the data packet from serving Node B 112, the RN 114 delays conveying an acknowledgment (ACK) of the data packet to serving Node B 112 until the RN has received (620) an acknowledgment (ACK) of the data packet from UE 102. In response to receiving the acknowledgment of the data packet from UE 102, RN 114 deletes the stored data packet from data packet buffer 306 and conveys (622) an acknowledgment (ACK) of the data packet to serving Node B 112 via the reverse link of Node B-RN wireless link 115. In response to receiving the acknowledgment of the data packet from RN 114, Node B 112 deletes (624) the data packet from buffer 406 and logic flow 600 then ends (626).

That is, when UE 102 correctly receives the data packet, the UE conveys to RN 114 via RN-UE wireless link 120, and the RN receives from the UE, an acknowledgment (ACK) of the data packet. On the other hand, if UE 102 erroneously receives the data packet, the UE may convey to RN 114 via RN-VE wireless link 120, and the RN may receive from the UE, a negative acknowledgment (NACK) or the UE may not acknowledge the data packet, that is, not convey any type of acknowledgment back to the RN. If RN 114 determines that UE 102 is likely to handoff, then the RN does not convey an acknowledgement of the data packet to Node B 112 until the RN receives an acknowledgment (ACK) of the data packet from the UE. Thus serving Node B 112, and other network elements of communication system 100 through communications with serving Node B, are able to determine whether a particular data packet has been successfully delivered to UE 102 and whether there is a need to attempt to deliver the data packet to the UE via a new, handoff target RN and/or Node B.

Figure 7:
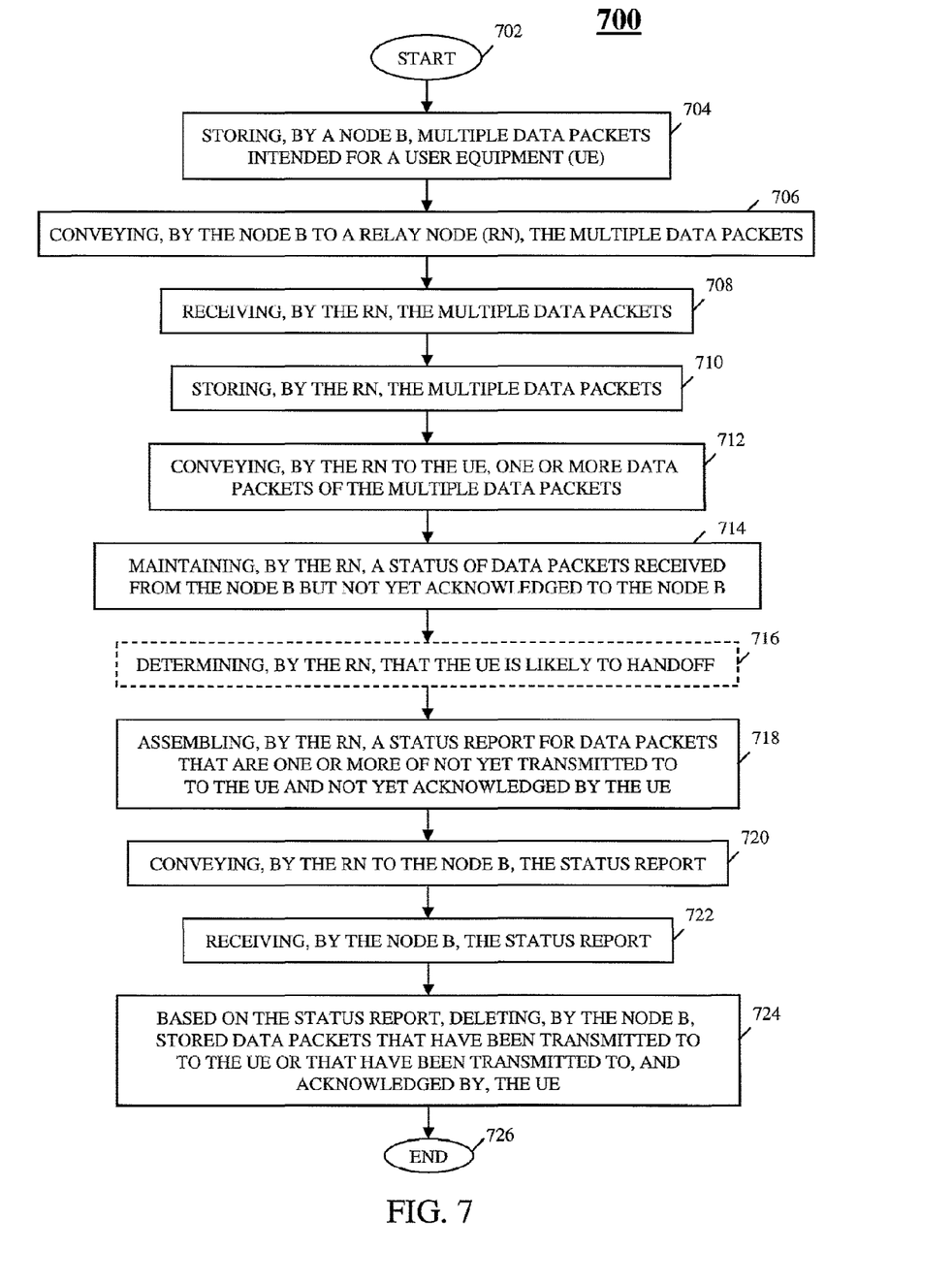
FIG. 7 is a logic flow diagram of a method executed by the communication system of FIG. 1 in acknowledging data packets in accordance with another embodiment of the present invention.

Referring now to FIG. 7, a logic flow diagram 700 is provided that illustrates a method executed by communication system 100 in communicating delivery of data packets to a UE in accordance with another embodiment of the present invention. Logic flow diagram 700 begins (702) when a serving Node B, such as Node B 112, conveys (706) to a served RN, such as RN 114, and the RN receives (708) from the Node B, via a first wireless link, that is, Node B-RN wireless link 115, multiple data packets intended for a UE, such as UE 102, serviced by the RN. Serving Node B 112 further stores (704) the multiple conveyed data packets in a data packet buffer 406 of the Node B. When the RN correctly receives each data packet of the multiple data packets, the RN stores (710) the data packet in a buffer 306 of the RN and conveys (712) the data packet to UE 102 via a second wireless link, that is, RN-UE wireless link 120.

RN 114, further maintains (714), in the at least one memory device 304 of the RN, a data packet status table 307. RN 114 stores, in data packet status table 307, a listing of data packets correctly received the RN from Node B 112 and, in association with each such data packet, an indication of whether the data packet has been transmitted to a UE for which the packet is intended, such as UE 102. RN 114 may further store, in the table, an indication of whether the data packet has been acknowledged by the UE. RN 114 may further include in table 307 information concerning a number of times each data packet has been transmitted to the intended UE. RN 114 further maintains, in association with each data packet, an identification of the UE for which the data packet is intended. For example, RN 114 may maintain a single data packet status table and, in association with each data packet, an identification of the UE for which the data packet is intended, or RN 114 may maintain a separate data packet status table for each UE served by the RN. Preferably, the data packet information included in data packet status table 307 concerns PDCP service data units (SDVs); however, those of ordinary skill in the art realize that the data packet information may be associated with any protocol layer that exchanges acknowledgments with a peer protocol layer, or is above a layer that exchanges acknowledgments with a peer protocol layer.

Periodically during a communication session involving the UE, or in response to a status report trigger such as every 'n' number of data packets received from serving Node B 112 for UE 102 or every 'm' number of data packet acknowledgments received from UE 102, RN 114 assembles (718), and conveys (720) to Node B 112 via the reverse link of Node B-RN wireless link 115, a status report indicating which data packets have one or more of (1) not yet been transmitted to UE 102 and (2) been transmitted to UE 102 but for which an acknowledgement has not been received from the UE. Preferably, the status report is a PDCP status report that is modified to include such information. For example, the status report may comprise a bitmap, wherein the bitmap includes bit positions that are each is associated with a data packet received by the RN from the Node B but not yet acknowledged by the RN to the Node B, and wherein the RN includes a value in each such position in the bitmap that indicates whether the data packet has been transmitted to UE 102. Such a status report may sent by the RN to the Node B regardless of whether the UE 102, RN 114, and Node B 112 are operating in a communication mode that does not require acknowledgments, such as an RLC unacknowledged mode (RLC-UM), or a communication mode that does require acknowledgments, such as an RLC acknowledged mode (RLC-AM). However, when UE 102, RN 114, and Node B 112 are operating in an acknowledgement mode, such as RLC-AM or a Transport Layer acknowledgment mode utilizing TCP acknowledgments, the bitmap may include for each data packet received by the RN from the Node B but not yet acknowledged by the RN to the Node B, in addition to or instead of an indication of whether the data packet identified has been transmitted to UE 102, an indication of whether the data packet has been acknowledged by the UE, that is, whether an acknowledgement of the data packet has been received by the RN from the UE.

When UE 102, RN 114, and Node B 112 are operating in a communication mode that does not require acknowledgments, then in response to receiving (722) the data packet status report, Node B 112 deletes (724), from buffer 406, stored data packets that are indicated, in the status report, as having been transmitted by RN 114 to the UE. For example, data packets that are indicated as having been transmitted by RN 114 to the UE may comprises data packets that are identified as having been transmitted by RN 114 to the UE or may comprise data packets that are not identified as not having been transmitted to the UE. When UE 102, RN 114, and Node B 112 are operating in a communication mode that does require acknowledgments, then in response to receiving the data packet status report, Node B 112 deletes (724), from buffer 406, stored data packets that are identified as having been transmitted to, and acknowledged by, the UE. Logic flow 700 then ends (726).

In another embodiment of the invention, RN 114 may determine (716) whether UE 102 is 'likely to handoff' before determining to convey the data packet status report. That is, assembly and conveyance of the data packet status report may be triggered by a determination, by RN 114, that UE 102 is 'likely to handoff.' In the absence of such a trigger, RN 114 may acknowledge, to Node B 112, each data packet correctly received from the Node B upon correct receipt of the data packet from the Node B or may convey data packet status reports to the Node B based on other triggers as described above.

An RN, such as RN 114, that delays acknowledging a data packet to a Node B until the RN receives an acknowledgement of the data packet from UE 102 in the event that the UE is likely to handoff, provides Node B 112 with a more accurate indication of whether a data packet has been successfully delivered to the UE than if the RN acknowledged a data packet merely upon receipt of the packet from the Node B. This allows the network of communication system 100 to better determine whether a particular data packet, delivered to a source RN, also should be forwarded to a target RN and/or Node B for conveyance to the UE after the UE hands off. Further, by use of a status report as opposed to individual acknowledgments for each data packet, communication system 100 provides a more efficient method of acknowledging, by a relay node such as RN 114, data packets that one or more of have not been transmitted to a UE, such as UE 102, or have been transmitted to the UE but for which an acknowledgement has not been received from the UE.

While the present invention has been particularly shown and described with reference to particular embodiments thereof, it will be understood by those skilled in the art that various changes may be made and equivalents substituted for elements thereof without departing from the scope of the invention as set forth in the IMS network below. Accordingly, the specification and figures are to be regarded in an illustrative rather than a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the communication system. As used herein, the terms "comprises," "comprising," or any variation thereof, are intended to cover a nonexclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus.

What is claimed is:

1. A method for determining at a Node B whether or not a packet has been delivered to a user equipment, the method comprising:
   transmitting the packet from the Node B to a relay node;
   when the relay node determines that the user equipment is not likely to handoff, receiving at the Node B from the relay node a first acknowledgement, wherein the first acknowledgement indicates that the relay node received the packet from the Node B, before the relay node receives a second acknowledgement, wherein the second acknowledgement indicates that the user equipment received the received packet from the relay node; and
   when the relay node determines that the user equipment is likely to handoff and has received the second acknowledgement from the user equipment, receiving at the Node B from the relay node the first acknowledgment.

2. The method of claim 1, wherein the acknowledgment received at the Node B is a Radio Link Control acknowledgment.

3. The method of claim 1, further comprising:
   storing the packet in a packet buffer at the Node B; and
   in response to receiving the acknowledgment at the Node B, deleting the packet from the packet buffer.

4. A Node B, comprising:
   a radio frequency transmitter;
   a radio frequency receiver; and
   a processor that is configured to
   control transmission of a packet from the Node B to a relay node, and
   control reception at the Node B of a first acknowledgement sent from the relay node, indicating that the relay node received the packet from the Node B, when (1) the relay node determines that the user equipment is not likely to handoff, before the relay node receives a second acknowledgement, wherein the second acknowledgement indicates that the user equipment received the received packet from the relay node, and (2) when the relay node determines that the user equipment is likely to handoff and has received the second acknowledgement from the user equipment.

5. The Node B of claim 4, wherein the acknowledgment received at the Node B is a Radio Link Control acknowledgment.

6. The Node B of claim 4, further comprising a packet buffer, and wherein the packet is stored in the packet buffer at the Node B, and in response to receiving the acknowledgment of the packet at the Node B, the packet is deleted from the packet buffer.

* * * * *